(12) United States Patent
Sakamaki et al.

(10) Patent No.: US 8,649,640 B2
(45) Date of Patent: Feb. 11, 2014

(54) OPTICAL 90-DEGREE HYBRID CIRCUIT

(75) Inventors: Yohei Sakamaki, Atsugi (JP); Yusuke Nasu, Atsugi (JP); Toshikazu Hashimoto, Atsugi (JP); Kuninori Hattori, Atsugi (JP); Hiroshi Takahashi, Atsugi (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 139 days.

(21) Appl. No.: 13/379,702

(22) PCT Filed: Jul. 22, 2010

(86) PCT No.: PCT/JP2010/004703
§ 371 (c)(1),
(2), (4) Date: Dec. 21, 2011

(87) PCT Pub. No.: WO2011/010469
PCT Pub. Date: Jan. 27, 2011

(65) Prior Publication Data
US 2012/0141067 A1 Jun. 7, 2012

(30) Foreign Application Priority Data
Jul. 22, 2009 (JP) ................................. 2009-171287

(51) Int. Cl.
*G02B 6/12* (2006.01)
*G02F 1/295* (2006.01)
*G02B 6/42* (2006.01)

(52) U.S. Cl.
USPC ............ 385/14; 385/1; 385/4; 385/5; 385/27; 385/39

(58) Field of Classification Search
USPC ................... 385/1–5, 8–9, 14, 27, 31, 39–42; 398/79–97
See application file for complete search history.

(56) References Cited

U.S. PATENT DOCUMENTS

2002/0126933 A1* 9/2002 Goh et al. ..................... 385/2

FOREIGN PATENT DOCUMENTS

| JP | 2008-177759 | 7/2008 |
| WO | WO 03/063515 | 7/2003 |

OTHER PUBLICATIONS

International Preliminary Report on Patentability issued Feb. 2, 2012 in PCT Application No. PCT/JP2010/004703, filed Jul. 22, 2010.
Sun Hyok Chang et al., *Impact of Quadrature Imbalance in Optical Coherent QPSK Receiver*, IEEE Photonics Technology Letters, vol. 21, No. 11, Jun. 1, 2009, pp. 709-711.

(Continued)

*Primary Examiner* — Uyen Chau N Le
*Assistant Examiner* — Michael Mooney
(74) *Attorney, Agent, or Firm* — Workman Nydegger

(57) ABSTRACT

The present invention provides an optical 90-degree hybrid circuit for reducing wavelength dependency of an IQ phase difference. An optical 90-degree hybrid circuit according to the present invention comprises a first demultiplexing optical coupler including a first and second input port, a second demultiplexing optical coupler including a third and fourth input port, first and second arm waveguides connected to the first and second input port, each having the same length, a third and fourth arm waveguides connected to the third and fourth input port, each having the same length, a 90-degree phase shift section installed in one of the first to fourth arm waveguides, a first optical coupler connected to the first and third arm waveguide, and a second optical coupler connected to the second and fourth arm waveguide, the light is inputted into the first and fourth input port or into the second and third input port.

4 Claims, 8 Drawing Sheets

(56) References Cited

OTHER PUBLICATIONS

Matthias Seimetz et al., *Options, Feasibility, and Availability of 2×4 90° Hybrids for Coherent Optical Systems,* Journal of Lightwave Technology, vol. 24, No. 3, Mar. 2006, pp. 1317-1322.

International Search Report issued Oct. 12, 2010 in PCT/JP2010/004703.

* cited by examiner

OPTICAL 90-DEGREE HYBRID CIRCUIT

TECHNICAL FIELD

This invention relates to an optical 90-degree hybrid circuit constituting an optical receiver used in a coherent receiver system in an optical transmission system, and in particular, to an optical 90-degree hybrid circuit in which wavelength dependency of a phase difference between in-phase output and quadrature output is small.

BACKGROUND ART

For realization of an ultra high-speed optical transmission system of 100 Gbit/s or more, an optical multi-valued modulation method has come to the fore. In particular, a coherent receiving method such as DP-QPSK (Dual Polarization Quadrature Phase-Shift Keying) has attracted attention because of its advantages of enhanced optical noise immunity and compensation performance by electrical signal processing on wavelength dispersion distortion after photoelectric conversion. Application of the coherent receiving method to a transmission system has been actively discussed. An optical receiver used in the coherent receiver system comprises a local oscillation light generating apparatus for generating local oscillation light, a polarization beam splitter for separating a signal light and a local oscillation light into different output ports corresponding to a polarization state, an optical 90-degree hybrid circuit for wave-combining the signal light and the local oscillation light, a photoelectric conversion section for converting an output signal from the optical 90-degree hybrid circuit into an electrical signal, an AD converter for converting the electrical signal from the photoelectric conversion section into a digital signal, and a digital signal processing (DSP) circuit for processing the digital signal. By separately detecting an in-phase component and a quadrature component of interference light of the inputted signal light and the inputted local oscillation light, it is possible to obtain information of the inputted signal light.

Among construction parts of the optical receiver used in the coherent receiver system, as to the optical 90-degree hybrid circuit, a product constituted by a spatial optical system by combining bulk type optical parts has been already developed and provided on the market. On the other hand, a planar light wave circuit (PLC) constituted by optical waveguides produced on a planar substrate is superior to the above-described spatial optical system in terms of mass production capabilities and reliability. In addition, by adopting the PLC optical 90-degree hybrid circuit, for example, the feasibility in regard to integration of the polarization beam splitter and the photoelectric conversion section is increased as compared to the spatial optical system, enabling a provision of a smaller-sized optical receiver. Under these circumstances, it is expected to put the PLC optical 90-degree hybrid circuit into practice.

FIG. 1 is a construction diagram showing a conventional PLC optical 90-degree hybrid circuit. The conventional PLC optical 90-degree hybrid circuit is shown in PTL 1. PTL 1 relates to an optical delay interference circuit used for demodulation of a DQPSK (differential quadrature phase-shift keying) signal. This circuit itself does not correspond to the part constituting the optical receiver used in the coherent receiver system, but includes, as a part of the circuit, a function as the optical 90-degree hybrid circuit which combines two optical waves and separates the combined wave into an in-phase component and a quadrature component. Hereinafter, the in-phase component is referred to as "I component", and the quadrature component is referred to as "Q component". In FIG. 1, among the optical circuits described in PTL 1, the construction of a circuit part alone necessary for realizing the optical 90-degree hybrid circuit is extracted to be shown.

Here, an explanation will be made of a propagation process of light inputted into the conventional PLC optical 90-degree hybrid circuit shown in FIG. 1. A signal light inputted via an input waveguide 1a from the PLC external is branched into two lights by an optical splitter 2a. A local oscillation light inputted via an input waveguide 1b from the PLC external is branched into two lights by an optical splitter 2b. The lights branched into two portions by the optical splitter 2a are inputted into two optical couplers 3a and 3b via arm waveguides 10a and 10b. The lights branched into two portions by the optical splitter 2b are inputted into the two optical couplers 3a and 3b via arm waveguides 10c and 10d. The signal light and the local oscillation light inputted into each of the optical coupler 3a and the optical coupler 3b are combined to be interfered with each other, which is branched into two lights for output so that a phase difference between the interference lights becomes 180 degrees. The interference lights of the signal light and the local oscillation light outputted from the optical coupler 3a travel via output waveguides 4a and 5a and are outputted into a differential optical receiver section 6a formed as an external circuit and serving as a photoelectric conversion section. The interference lights of the signal light and the local oscillation light outputted from the optical coupler 3b travel via output waveguides 4b and 5b and are outputted into a differential optical receiver section 6b formed as an external circuit and serving as a photoelectric conversion section.

A 90-degree phase shift section is provided in any one of the four arm waveguides 10a, 10b, 10c, and 10d. Thereby the interference lights outputted via the output waveguides 4a, 4b, 5a and 5b from the respective optical coupler 3a and the optical coupler 3b can be differentially demodulated by the differential optical receivers 6a and 6b to separate I component and Q component of the inputted modulation signal. Here, for simultaneously detecting I component and Q component of the modulation signal, it is necessary that waveguide lengths of the two arm waveguides 10a and 10b for transmitting the signal lights branched in the optical splitter 2a each are made equal and waveguide lengths of the two arm waveguides 10c and 10d for transmitting the local oscillation lights branched in the optical splitter 2b each are made equal excluding the 90-degree phase shift section 7. Further, waveguide lengths of the four arm waveguides 10a, 10b, 10c and 10d each are made equal excluding the 90-degree phase shift section 7, and thereby, it is possible to use this circuit also as the optical 90-degree hybrid circuit constituting the optical delay interference circuit for receiving the differential phase modulation signal such as DQPSK.

CITATION LIST

Patent Literature

PTL 1: Pamphlet of International Patent Laid-Open WO 2003/063515

Non Patent Literature

NPL 1: S. H. Chang, H. S. Chung and K. Kim, "Impact of Quadrature imbalance in optical coherent QPSK receiver", IEEE Photonics Technology Letters, vol. 21, no. 11, pp. 709-711, Jun. 1, 2009.

NPL 2: Seimetz, M. Weinert, "feasibility, and availability of 2/spl times/4 90/spl deg/hybrids for coherent optical systems", IEEE Journal of Lightwave Technology, vol. 24, no. 3, pp. 1317-1322, Mar. 13, 2006.

SUMMARY OF INVENTION

Technical Problem

However, the problem as explained below will occur because of the construction of the 90-degree phase shift section 7. The 90-degree phase shift section 7 is installed aiming at changing an optical path length through which propagation light passes by an amount of $\lambda \times (\pm \frac{1}{4} + m)$ only. Here, $\lambda$ indicates a wave length of a signal light or a local oscillation light and m indicates an integral number. As shown in NPL 1, when a phase shift θ of the propagation light in the 90-degree phase shift section 7 is shifted out of 90 degrees, demodulation performance degrades. For example, in a case of not correcting the shift of the phase shift θ out of 90 degrees in the digital signal processing circuit, it is necessary to control the shift of the phase shift θ out of 90 degrees within ±five degrees for restricting OSNR (optical signal noise ratio) penalty below 0.5 dB in a case of a BER (bit error rate)=$10^{-3}$.

As the construction of the 90-degree phase shift section 7, there is a method in which a thin film heater is attached on the upper surface of the PLC, and power is applied to the thin film heater to heat the core circumference constituting waveguides, thereby adjusting an active refraction index of the core. When a changing amount of a refraction index by heating the core is indicated at ΔN and a heater length is indicated at L, the following formula is established.

$$L \times \Delta N = (\pm \frac{1}{4} + m)\lambda \quad (1)$$

In a case of this construction, it is possible to adjust a phase shift θ exactly at 90 degrees by adjustment of applied power. Meanwhile, it is necessary to apply constant power all the time for this construction to function as the optical 90-degree hybrid circuit, which raises a problem of leading to an increase in consumption power of the optical receiver. Considering an influence of a change in the heater and the wiring portion with time, it is necessary to add a monitoring function of the phase shift θ, which may cause the possibility that the optical receiver and the control mechanism become complicated.

There is a method of adjusting a length of the waveguide as the construction of a 90-degree phase shift section 7 different from the above-described. In this case, only in regard to the optical waveguide in which the 90-degree phase shift section 7 is installed among four arm waveguides 10a, 10b, 10c, and 10d, it is only required to change a length of the waveguide in such a manner as to meet the following formula.

$$\Delta L \times N(\lambda) = (\pm \frac{1}{4} + m)\lambda \quad (2)$$

Here, N (λ) indicates an active refraction index of the core constituting the waveguide and is expressed by a function of a wavelength λ. This construction has an advantage that the power is not used at all and the monitoring function of the phase shift θ is unnecessary. However, since ΔL can be set only to some unique value, the phase shift θ depends on a wavelength λ of propagation light. For example, in a case where ΔL of the 90-degree phase shift section 7 is designed in such a manner that some wavelength $\lambda_x$ meets the formula (2) ($\theta_1$=90 degrees), a phase shift $\theta_2$ in a different wavelength $\lambda_y$ is expressed by the following formula.

Equation 1

$$\theta_2 = \frac{N(\lambda_y) \cdot \lambda_x}{N(\lambda_x) \cdot \lambda_y} \theta_1 \quad (3)$$

As an operational wave length range of 90-degree hybrid circuit expands, the shift of the phase shift θ from 90 degrees becomes larger, thus increasing an influence on deterioration of reception characteristics.

The present invention is made in view of the foregoing problem. An object of the present invention is to provide an optical 90-degree hybrid circuit for realizing a reduction of wavelength dependency, and in more detail, to an optical 90-degree hybrid circuit for realizing a reduction of wavelength dependency in a phase difference between In-phase output and Quadrature output (hereinafter, described as "IQ phase difference").

Solution to Problem

For achieving such an object, the invention as defined in claim 1 according to the present invention is provided with an optical 90-degree hybrid circuit comprising a first demultiplexing optical coupler including a first input port and a second input port and branching light into two lights, a second demultiplexing optical coupler including a third input port and a fourth input port and branching light into two lights, a first arm waveguide connected via a through port of the first input port and via a cross port of the second input port, a second arm waveguide connected via a cross port of the first input port and via a through port of the second input port, having a length equal to that of the first arm waveguide, a third arm waveguide connected via a through port of the third input port and via a cross port of the fourth input port, a fourth arm waveguide connected via a cross port of the third input port and via a through port of the fourth input port, having a length equal to that of the third arm waveguide, a 90-degree phase shift section installed in one of the first to fourth arm waveguides to shift a phase of light by 90 degrees, a first optical coupler connected to the first arm waveguide and the third arm waveguide, and a second optical coupler connected to the second arm waveguide and the fourth arm waveguide, wherein the light is inputted into the first input port and the fourth input port or into the second input port and the third input port The invention as defined in claim 2 according to the optical 90-degree hybrid circuit as defined in claim 1 is provided with the 90-degree hybrid circuit, wherein each of the first demultiplexing optical coupler and the second demultiplexing optical coupler comprises a directional coupler.

The invention as defined in claim 3 according to the optical 90-degree hybrid circuit as defined in claim 1 is provided with the 90-degree hybrid circuit, wherein each of the first demultiplexing optical coupler and the second demultiplexing optical coupler comprises an MMI coupler.

Advantageous Effects of Invention

According to the present invention, it is possible to reduce the wavelength dependency of the IQ phase difference in the optical 90-degree hybrid circuit. The optical coupler provided with the two input ports and the two output ports is used as the optical splitter coupled to the input waveguide in the optical 90-degree hybrid circuit, and a combination of the input waveguides coupled to the input ports in the respective demultiplexing optical couplers is selected, thus providing the circuit construction appropriate to a reduction of the wavelength dependency of the IQ phase difference.

DESCRIPTION OF EMBODIMENTS

The present invention provides an optical 90-degree hybrid circuit for reducing wavelength dependency of an IQ phase difference due to wavelength dependency of a phase shift θ in a 90-degree phase shift section.

Figure 2:
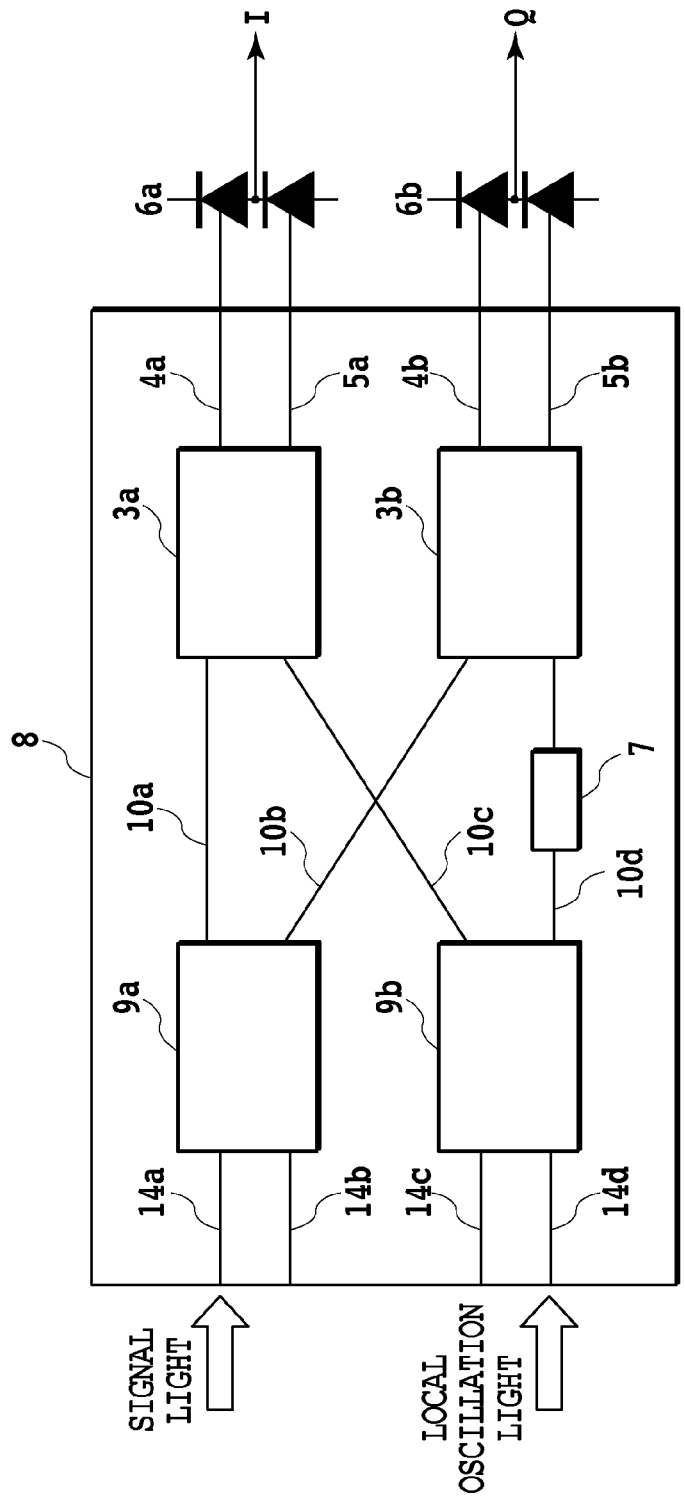
FIG. 2 is a construction diagram showing an optical 90-degree hybrid circuit according to an embodiment of the present invention.

FIG. 2 is a diagram showing the construction of an optical 90-degree hybrid circuit for reducing wavelength dependency of an IQ phase difference according to the present invention. An optical 90-degree hybrid circuit according to the present invention comprises a demultiplexing optical coupler 9a coupled to an input waveguide 14a and an input waveguide 14b, a demultiplexing optical coupler 9b coupled to an input waveguide 14c and an input waveguide 14d, arm waveguides 10a and 10b coupled to the demultiplexing optical coupler 9a, arm waveguides 10c and 10d coupled to the demultiplexing optical coupler 9b, a 90-degree phase shift section 7 installed in the arm waveguide 10d, an optical coupler 3a coupled to the arm waveguides 10a and 10c, an optical coupler 3b coupled to the arm waveguides 10b and 10d, output waveguides 4a and 5a coupled to the optical coupler 3a, and output waveguides 4b and 5b coupled to the optical coupler 3b.

The demultiplexing optical coupler 9a has two input ports and two output ports, is coupled to the input waveguide 14a and the input waveguide 14b via the two input ports, and is coupled to the arm waveguides 10a and 10b via the two output ports. In addition, the demultiplexing optical coupler 9a has a through port and a cross port coupling the two input ports and the two output ports respectively. The demultiplexing optical coupler 9b has two input ports and two output ports, is coupled to the input waveguides 14c and the input waveguides 14d via the two input ports, and is coupled to the arm waveguides 10c and 10d via the two output ports. In addition, the demultiplexing optical coupler 9b has a through port and a cross port coupling the two input ports and the two output ports respectively.

In FIG. 2, the signal light is inputted via the input waveguide 14a into the demultiplexing optical coupler 9a and the local oscillation light is inputted via the input waveguide 14d into the demultiplexing optical coupler 9b.

By referring to FIG. 2, an explanation will be made of the propagation process of each of the signal light inputted into the input waveguide 14a and the local oscillation light inputted into the input waveguide 14b. The signal light inputted from the PLC external is branched via the input waveguide 14a into two lights by the demultiplexing optical coupler 9a. The local oscillation light inputted from the PLC external is branched via the input waveguide 14d into two lights by the demultiplexing optical coupler 9b. One of the two lights branched by the demultiplexing optical coupler 9a is inputted into the optical coupler 3a via the arm waveguide 10a, and the other one is inputted into the optical coupler 3b via the arm waveguide 10b. One of the two lights branched by the demultiplexing optical coupler 9b is inputted into the optical coupler 3a via the arm waveguide 10c, and the other one a phase of which is shifted by 90 degrees by the 90-degree phase shift section 7 in the arm waveguide 10d is inputted into the optical coupler 3b via the arm waveguide 10d. Two lights inputted into the optical coupler 3a are combined to create interference light. Two lights inputted into the optical coupler 3b are combined to create interference light. The interference lights outputted from the optical coupler 3a are outputted via the output waveguides 4a and 5a into a differential receiver 6a. The interference lights outputted from the optical coupler 3b are outputted via the output waveguides 4b and 5b into a differential receiver 6b.

The signal light inputted into the input waveguide 14a is coupled via the through port of the input port coupled to the input waveguide 14a to the arm waveguide 10a and is coupled via the cross port of the input port to the arm waveguide 10b. The local oscillation light inputted into the input waveguide 14d is coupled via the through port of the input port coupled to the input waveguide 14d to the arm waveguide 10d and is coupled via the cross port of the input port to the arm waveguide 10c.

In the construction in FIG. 2, a relative phase difference of the light inputted into the arm waveguide 10b to the light inputted into the arm waveguide 10a is 90 degrees, and a relative phase difference of the light inputted into the arm waveguide 10d to the light inputted into the arm waveguide 10c is −90 degrees.

Each of the differential receivers 6a and 6b is formed as an external circuit, functions as a photoelectric conversion section, and differentially demodulates the interference lights outputted from each of the optical couplers 3a and 3b to separate I component and Q component of the inputted modulation signal.

Figure 1:
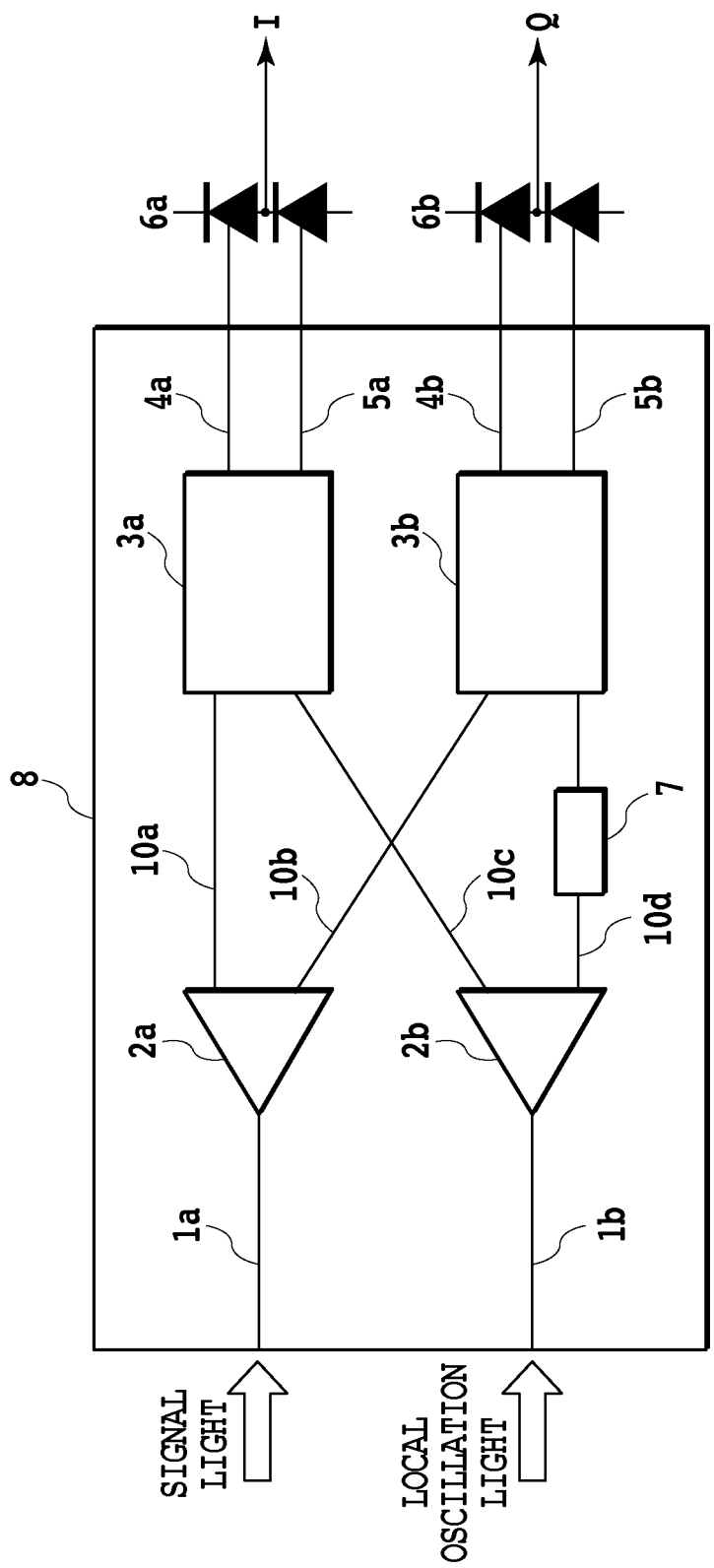
FIG. 1 is a construction diagram showing an optical 90-degree hybrid circuit in the conventional technology.

A difference of the construction in the present invention from the conventional technology shown in FIG. 1 lies in a point of introducing the demultiplexing optical couplers 9a and 9b instead of the optical splitters 2a and 2b for branching the local oscillation light into two lights. As a result of the introduction of the demultiplexing optical couplers 9a and 9b, it is possible to reduce wavelength dependency of an IQ phase difference due to wavelength dependency of a phase shift θ in the 90-degree phase shift section 7.

A principle of reducing the wavelength dependency of the optical 90-degree hybrid circuit according to the present invention will be hereinafter explained in detail. As each of the demultiplexing optical couplers 9a and 9b, a directional coupler or an MMI (multi-mode-interference) coupler provided with two or more input ports and two or more output ports is used. Here, an explanation thereof will be made by taking the MMI coupler provided with two input ports and two output ports as an example.

The MMI coupler is designed so that the light inputted into one of the two input ports is outputted in an equal strength from the two output ports. Such MMI coupler can be easily designed with a numerical calculation by using a known beam propagation method (BPM). The above MMI coupler effects the function similar to that of the optical splitters 2a and 2b shown in the conventional technology (FIG. 1). When attention is paid to a phase relation of the lights outputted from the two output ports, it can be confirmed with the numerical calculation by using the BPM that the phase is shifted by about 90 degrees from each other.

Here, by focusing on the wavelength dependency of the phase difference of the lights outputted from the two output ports of the demultiplexing optical couplers 9a and 9b, which is shifted out of 90 degrees, the phase difference is indicated at a value of $90+\alpha \times (\lambda - \lambda_1)$. $\alpha$ depends on the structure of each of the demultiplexing optical couplers 9a and 9b and is a constant of a unit (degree/nm). $\lambda_1$ is determined by the design of each of the demultiplexing optical couplers 9a and 9b. In a case where a wavelength $\lambda$ of the input light is in agreement with $\lambda_1$, a phase difference of the lights outputted from the demultiplexing optical couplers 9a and 9b is 90 degrees.

The phase shift θ in the 90-degree phase shift section 7 is indicated at a formula of $90+\beta \times (\lambda - \lambda_2)$ in consideration of the wavelength dependency of the shift out of 90 degrees. Here, $\beta$ is a constant of a unit (degree/nm). $\lambda_2$ is determined by the design of the 90-degree phase shift section 7. In a case where a wavelength $\lambda$ of the input light is in agreement with $\lambda_2$, a phase shift θ in the 90-degree phase shift section 7 is 90 degrees.

Here, for achieving the effect in the construction of the 90-degree hybrid circuit according to the present invention for reducing the wavelength dependency of the IQ phase difference, a combination on into which input waveguide the signal light or the local oscillation light is inputted among the input waveguides connected to the two ports of each of the demultiplexing optical couplers 9a and 9b is important.

FIG. 2 is a construction diagram of the 90-degree hybrid circuit according to the present invention in which the signal light is inputted into the input waveguide 14a and the local oscillation light is inputted into the input waveguide 14d. Table 1 shows a table where in the construction of the present invention in FIG. 2 and the construction of the conventional technology in FIG. 1, in a case of setting a phase of light outputted from the output waveguide 4a as a reference, a relative phase relation of light outputted from each of the output waveguides 4b, 5a and 5b is shown. It is assumed that $\Delta\lambda_1 = \lambda - \lambda_1$ and $\Delta\lambda_2 = \lambda - \lambda_2$. A calculation method of each of Table 1 and Table 3 described later is shown in NPL 2.

Here, an explanation will be made of the calculation method of each of Table 1 and Table 3. It is assumed that a phase difference between two outputs of the optical splitters 2a and 2b is zero, a phase difference between two outputs of each of the demultiplexing optical couplers 9a and 9b and the optical couplers 3a and 3b is $90+\alpha\Delta\lambda_1$ (degrees), and a phase of light passing through the 90-degree phase shift section 7 is $+(90+\beta\Delta\lambda_2)$ (degrees). In Table 1 and Table 3, the cross port output of each of the demultiplexing optical couplers 9a and 9b and the optical couplers 3a and 3b is assumed as $+(90+\alpha\Delta\lambda_1)$ (degrees). Assuming a phase of the signal light at the inputting into the optical splitters 2a and 2b or the demultiplexing optical couplers 9a and 9b to be zero, a phase in each of the four output waveguides 4a, 5a, 4b and 5b is calculated in accordance with the above condition. Assuming a phase of the local oscillation light at the inputting into the optical splitters 2a and 2b or the demultiplexing optical couplers 9a and 9b to be zero, a phase in each of the four output waveguides 4a, 5a, 4b and 5b is calculated according to the above condition. A phase difference between the signal light and the local oscillation light in each of the four output waveguides 4a, 5a, 4b and 5b is calculated. Values in Table 1 and Table 3 are calculated by applying an offset to the calculation result of the phase difference between the signal light and the local oscillation light in each of the output waveguides in such a manner that the phase difference in the output wavelength 4a becomes zero.

TABLE 1

| | 4a | 5a | 4b | 5b |
|---|---|---|---|---|
| Conventional Technology | 0 | $180 + 2\alpha\Delta\lambda_1$ | $-90 + \beta\Delta\lambda_2$ | $90 + 2\alpha\Delta\lambda_1 - \beta\Delta\lambda_2$ |
| Present Invention | 0 | $180 + 2\alpha\Delta\lambda_1$ | $90 + 2\alpha\Delta\lambda_1 - \beta\Delta\lambda_2$ | $270 + 4\alpha\Delta\lambda_1 - \beta\Delta\lambda_2$ |

Here, it is assumed that lengths of the four arm waveguides 10a, 10b, 10c and 10d all are equal. In addition, the demultiplexing optical couplers 9a and 9b and the optical couplers 3a and 3b are assumed to be the MMI coupler of the same design. As the IQ phase difference in the optical 90-degree hybrid circuit, it is necessary to evaluate the phase difference of the lights outputted between the output waveguides 4a and 4b, between the output waveguides 4b and 5a, between the output waveguides 5a and 5b, and between the output waveguides 5b and 4a. Table 2 shows a table where in the construction of the present invention in FIG. 2 and the construction of the conventional technology in FIG. 1, the shift of a phase difference of lights outputted between the output waveguides 4a and 4b, between the output waveguides 4b and 5a, between the output waveguides 5a and 5b, and between the output waveguides 5b and 4a out of 90 degrees or −90 degrees is shown.

TABLE 2

| | 4a − 4b | 4b − 5a | 5a − 5b | 5b − 4a |
|---|---|---|---|---|
| Conventional technology | $\beta\Delta\lambda_2$ | $-(2\alpha\Delta\lambda_1 + \beta\Delta\lambda_2)$ | $\beta\Delta\lambda_2$ | $-(2\alpha\Delta\lambda_1 - \beta\Delta\lambda_2)$ |
| Present Invention | $-(2\alpha\Delta\lambda_1 - \beta\Delta\lambda_2)$ | $-\beta\Delta\lambda_2$ | $-(2\alpha\Delta\lambda_1 - \beta\Delta\lambda_2)$ | $-(4\alpha\Delta\lambda_1 - \beta\Delta\lambda_2)$ |

It is understood that in the optical 90-degree hybrid circuit in the conventional technology, the IQ phase difference is shifted by $\{\beta \Delta\lambda_2, 2\alpha \Delta\lambda_1 + \beta \Delta\lambda_2, 2\alpha \Delta\lambda_1 - \beta \Delta\lambda_2\}$ at the maximum from 90 degrees. Here, "$x_1, x_2, \ldots x_n$" at the maximum means the maximum value of the absolute values among the numerical values "$x_1, x_2, \ldots x_n$". Meanwhile, it is understood that in the optical 90-degree hybrid circuit according to the present invention shown in FIG. 2, the IQ phase difference is shifted by $\{\beta \Delta\lambda_2, 2\alpha \Delta\lambda_1 - \beta \Delta\lambda_2, 4\alpha \Delta\lambda_1 - \beta \Delta\lambda_2\}$ at the maximum from 90 degrees. In a case where $\{\beta \Delta\lambda_2, 2\alpha \Delta\lambda_2 + \beta \Delta\lambda_2, 2\alpha \Delta\lambda_1 - \beta \Delta\lambda_2\}$ at the maximum $> \{\beta \Delta\lambda_2, 2\alpha \Delta\lambda_1 - \beta \Delta\lambda_2, 4\alpha \Delta\lambda_1 - \beta \Delta\lambda_2\}$ at the maximum, the effect of reducing the wavelength dependency of the IQ phase difference according to the construction of the present invention shown in FIG. 2 can be achieved.

Figure 3:
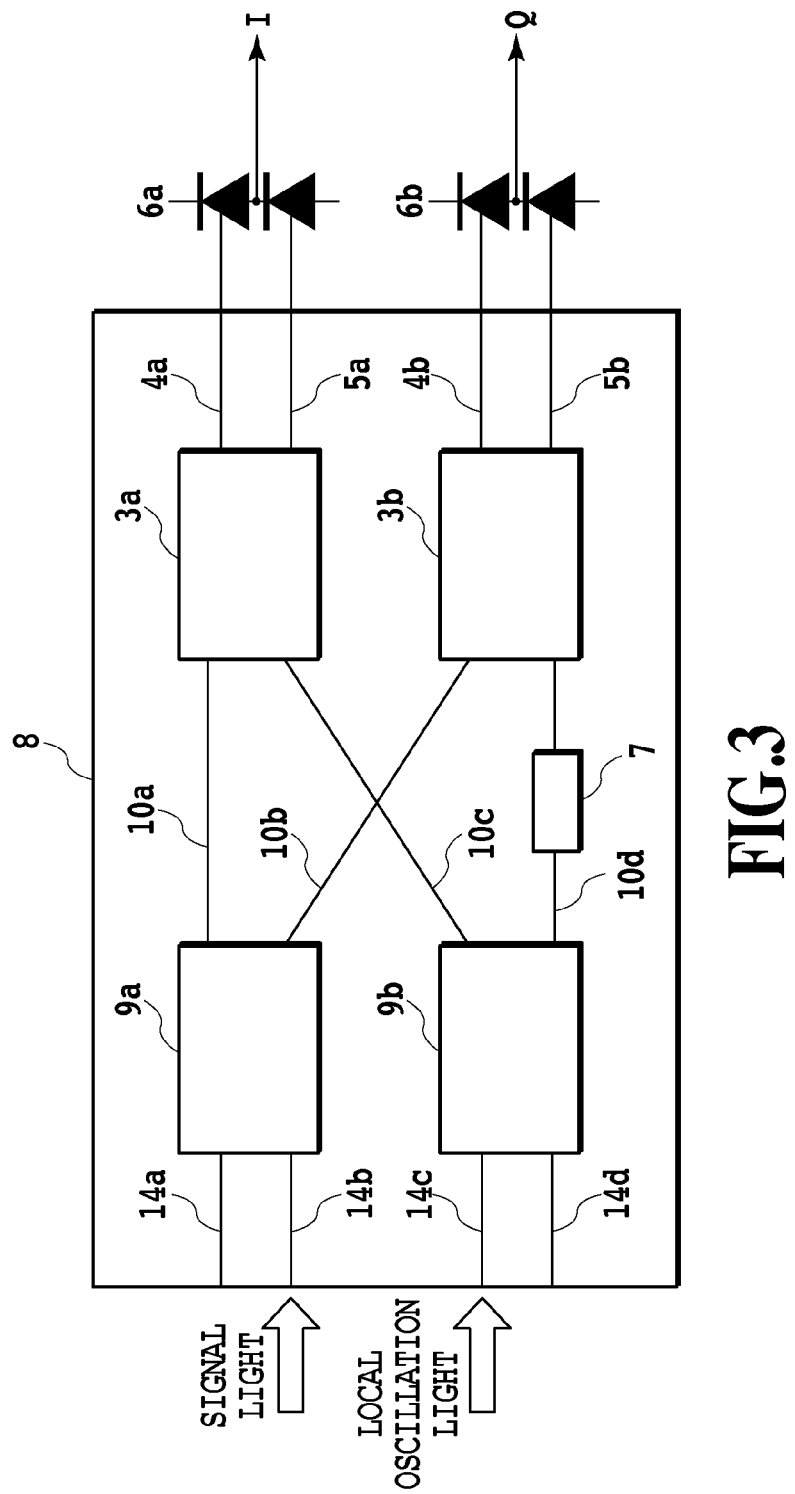
FIG. 3 is a construction diagram showing an optical 90-degree hybrid circuit according to a different embodiment of the present invention.

FIG. 3 is a construction diagram of an optical 90-degree hybrid circuit according to a different embodiment in the present invention. FIG. 3 differs in a point where the signal light is inputted into the input waveguide 14b and the local oscillation light is inputted into the input waveguide 14c, from the construction shown in FIG. 2.

In the construction in FIG. 3, the signal light inputted into the input waveguide 14b is coupled via the cross port of the input port coupled to the input waveguide 14b to the arm waveguide 10a and is coupled via the through port of the input port to the arm waveguide 10b. The local oscillation light inputted into the input waveguide 14c is coupled via the cross port of the input port coupled to the input waveguide 14c to the arm waveguide 10d and is coupled via the through port of the input port to the arm waveguide 10c.

In the construction in FIG. 2, a relative phase difference of the light inputted into the arm waveguide 10b to the light inputted into the arm waveguide 10a is −90 degrees, and a relative phase difference of the light inputted into the arm waveguide 10d to the light inputted into the arm waveguide 10c is 90 degrees.

Table 3 shows a table where in the construction of the present invention in FIG. 3 and the construction of the conventional technology in FIG. 1, in a case of setting a phase of light outputted from the output waveguide 4a as a reference, a relative phase relation of light outputted from each of the output waveguides 4b, 5a and 5b is shown.

TABLE 3

|  | 4a | 5a | 4b | 5b |
|---|---|---|---|---|
| Conventional technology | 0 | $180 + 2\alpha\Delta\lambda_1$ | $-90 - \beta\Delta\lambda_2$ | $90 + (2\alpha\Delta\lambda_1 - \beta\Delta\lambda_2)$ |
| Present Invention | 0 | $180 + 2\alpha\Delta\lambda_1$ | $90 - (2\alpha\Delta\lambda_1 + \beta\Delta\lambda_2)$ | $-90 - \beta\Delta\lambda_2$ |

Here, it is assumed that lengths of the four arm waveguides 10a, 10b, 10c and 10d all are equal. In addition, the demultiplexing optical couplers 9a and 9b, and the optical couplers 3a and 3b are assumed to be the MMI coupler of the same design. Table 4 shows a table where in the construction of the present invention in FIG. 3 and the construction of the conventional technology in FIG. 1, the shift of a phase difference of lights between the output waveguides 4a and 4b, between the output waveguides 4b and 5a, between the output waveguides 5a and 5b, and between the output waveguides 5b and 4a each out of 90 degrees or −90 degrees is shown.

TABLE 4

|  | 4a − 4b | 4b − 5a | 5a − 5b | 5b − 4a |
|---|---|---|---|---|
| Conventional | $\beta\Delta\lambda_2$ | $-2\alpha\Delta\lambda_1 - \beta\Delta\lambda_2$ | $\beta\Delta\lambda_2$ | $2\alpha\Delta\lambda_1 - \beta\Delta\lambda_2$ |
| Present Invention | $2\alpha\Delta\lambda_1 + \beta\Delta\lambda_2$ | $-4\alpha\Delta\lambda_1 - \beta\Delta\lambda_2$ | $2\alpha\Delta\lambda_1 + \beta\Delta\lambda_2$ | $-\beta\Delta\lambda_2$ |

It is understood that in the conventional optical 90-degree hybrid circuit, the IQ phase difference is shifted by $\{\beta \Delta\lambda_2, 2\alpha \Delta\lambda_2+\beta \Delta\lambda_2, 2\alpha \Delta\lambda_2-\beta \Delta\lambda_2\}$ at the maximum from 90 degrees. Meanwhile, it is understood that in the optical 90-degree hybrid circuit according to the present invention shown in FIG. 3, the IQ phase difference is shifted by $\{\beta \Delta\lambda_2, 2\alpha \Delta\lambda_2+\beta 66 \lambda_2, 4\alpha \Delta\lambda_2+\beta \Delta\lambda_2\}$ at the maximum from 90 degrees. In a case where $\{\beta \Delta\lambda_2, 2\alpha \Delta\lambda_2+\beta \Delta\lambda_2, 2\alpha \Delta\lambda_2-\beta \Delta\lambda_2\}$ at the maximum $>\{\beta \Delta\lambda_2, 2\alpha \Delta\lambda_2+\beta \Delta\lambda_2, 4\alpha \Delta\lambda_2+\beta \Delta\lambda_2\}$ at the maximum, the effect of reducing the wavelength dependency of the IQ phase difference according to the construction of the present invention shown in FIG. 3 can be achieved.

The input waveguide into which the signal light or the local oscillation light is inputted is selected based upon a phase relation of the light outputted from the demultiplexing optical coupler. A relative phase difference of light inputted into the arm waveguide 10b to light inputted into the arm waveguide 10a is assumed as $\theta_a$ and a relative phase difference of light inputted into the arm waveguide 10d to light inputted into the arm waveguide 10c is assumed as $\theta_b$. According to the conventional technology, since a phase of light is not shifted in the optical splitters 2a and 2b into which the signal light or the local oscillation light is inputted, $\{\theta_a, \theta_b\}=(0, 0)$. On the other hand, in a case of the construction in FIG. 2, in the demultiplexing optical couples 9a and 9b into which the signal light or the local oscillation light is inputted, the phase of the light is shifted to be $\{\theta_a, \theta_b\}=(+90, -90)$. In a case of the construction in FIG. 3, the phase of the light is shifted to be $\{\theta_a, \theta_b\}=(-90, +90)$. What is important is that in the construction of the present invention, $\theta_a \neq \theta_b$. In a case where the four waveguides are arranged as in the case of the construction diagram in the present invention, in a combination of the input waveguides into which the signal light or the local oscillation light is inputted, $\{\theta_a, \theta_b\}=(+90, +90)$ or $\{\theta_a, \theta_b\}=(-90, -90)$. In this case, $\theta_a=\theta_b$, wherein the effect of the present invention can not be achieved.

It should be noted that here, the explanation was made by taking the MMI coupler as an example, but each of the demultiplexing optical couplers 9a and 9b constituting the present invention is not limited to the MMI coupler, and a directional coupler provided with two input ports and two output ports may be used. In addition, in each of FIG. 2 and FIG. 3, the waveguide, into which the light is not inputted, among the two waveguides connected to each of the demultiplexing optical couplers 9a and 9b is also illustrated, but the waveguide into which the light is not inputted may disappear without mentioning. It should be noted that in the construction of the present invention explained above, the signal light is inputted into the demultiplexing optical coupler 9a and the local oscillation light is inputted into the demultiplexing optical coupler 9b, but even in a case of replacing the input position of the signal light and the input position of the local oscillation light with each other, it is apparent that the function of the optical 90-degree hybrid circuit of separating I component and Q component intersected vertically with each other is effected and the effect of the present invention is not damaged. Further, all the lengths of the four arm waveguides 10a, 10b, 10c and 10d are assumed to be equal, but also in a case where the lengths of the arm waveguides 10a and 10b are set to be equal and the lengths of the arm waveguides 10c and 10d are set to be equal, the effect of the present invention can be achieved.

First Embodiment

Figure 4:
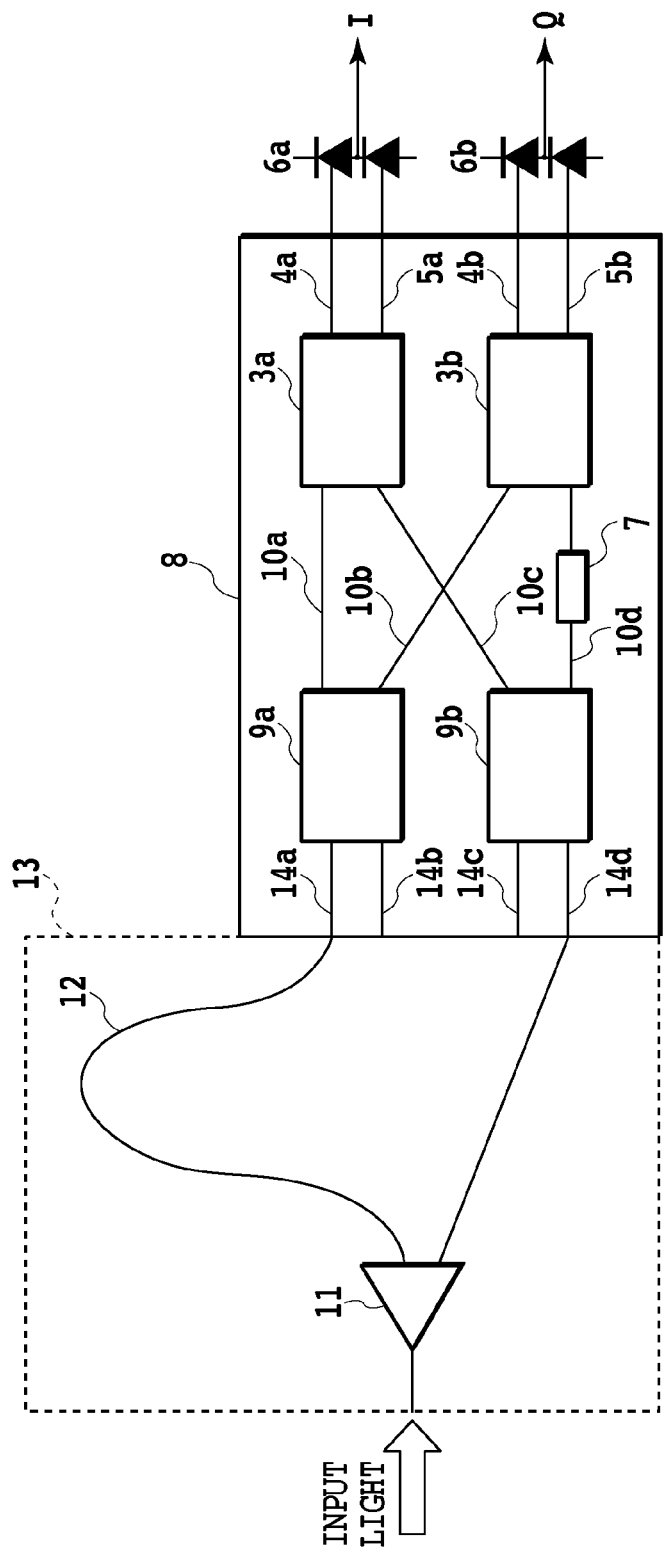
FIG. 4 is a schematic diagram showing an optical 90-degree hybrid circuit according to a first embodiment of the present invention.

FIG. 4 is a schematic diagram showing an optical 90-degree hybrid circuit actually produced according to a first embodiment. In the present embodiment, an MMI coupler provided with two input ports and two output ports was used as each of the demultiplexing optical couplers 9a and 9b. In addition, MMI coupler was designed in such a manner as to meet a condition of $\lambda_1=1550$ nm. The 90-degree phase shift section 7 was designed in such a manner as to meet a condition of $\lambda_2=1550$ nm. The PLC technology was used for production of the optical 90-degree hybrid circuit. Specially flame hydrolysis deposition and reactive ion etching were used to produce silica-based glass waveguides on a silicon substrate. A cross section configuration of a core has a four-way angle of 4.5 µm, and a specific refraction index difference is 1.5%. The core was embedded by over-clad glass having a thickness of 30 µm.

For evaluating the IQ phase difference experimentally, an optical delay circuit section 13 constructed of the optical splitter 11 and a delay line 12 was coupled to the input waveguides 14a and 14b of the optical 90-degree hybrid in the present invention. This circuit construction is formed in order that light outputted from the same light source instead of the signal light and the local oscillation light in FIG. 2 is branched, a delay is provided through the delay line to one of the branched lights, and both of the lights each are inputted into the input waveguides 14a and 14d in the optical 90-degree hybrid circuit, thus constructing an optical delay interference circuit. With adoption of the optical delay interference circuit, it is possible to calculate a relative phase difference between lights outputted from the output waveguides 4a, 4b, 5a and 5b, based upon transmission spectra outputted from the output waveguides 4a, 4b, 5a and 5b. It is apparent that this circuit construction functions as the optical 90-degree hybrid circuit by removing the optical delay circuit section 13 after the IQ phase difference evaluation is made, and the effect of the present invention is not damaged.

Figure 5A:
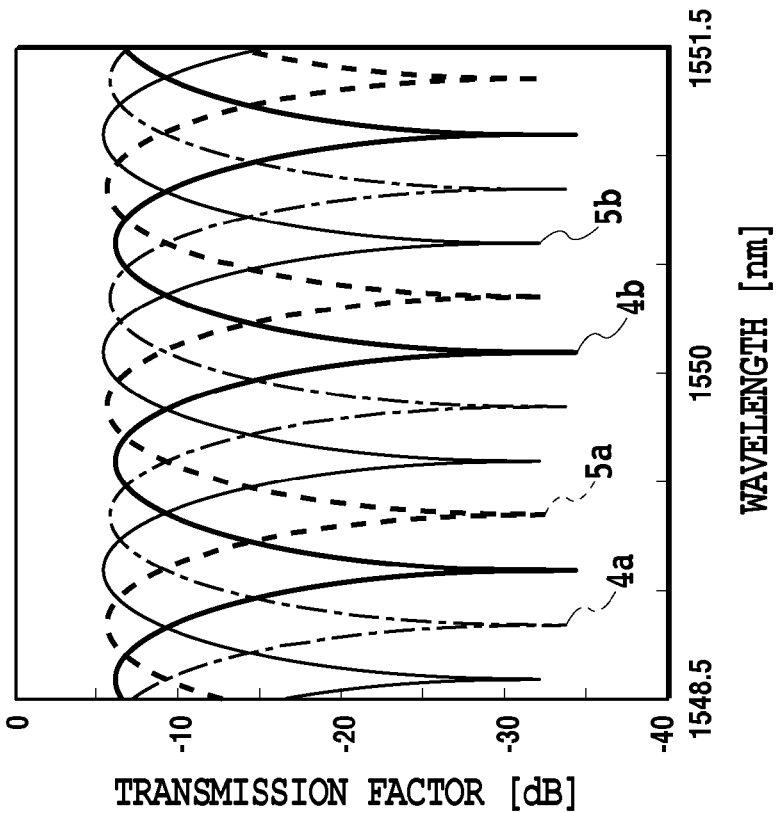
FIG. 5A is a diagram showing a transmission spectra measurement result in the optical 90-degree hybrid circuit according to the first embodiment of the present invention.
Figure 5B:
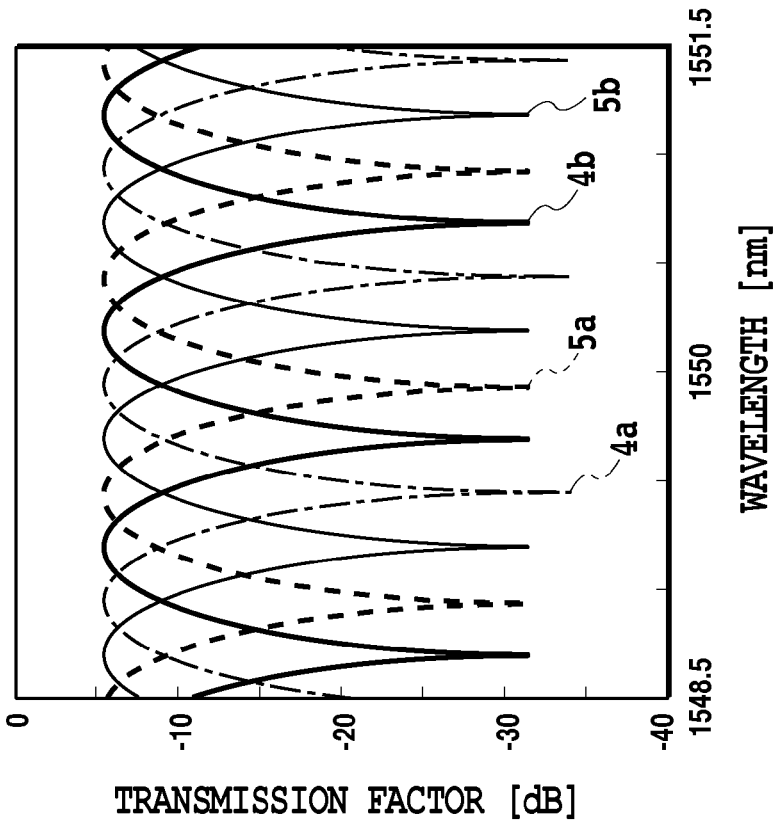
FIG. 5B is a diagram showing a transmission spectra measurement result in the optical 90-degree hybrid circuit according to the conventional technology.

FIG. 5A and FIG. 5B are diagrams each showing a transmission spectra measurement result in the produced optical 90-degree hybrid circuit. For comparison with the conventional technology, the optical 90-degree hybrid circuit in the conventional technology was produced in the same production process as that of the first embodiment in the present invention to evaluate phase differences between the respective outputs. FIG. 5A shows a diagram showing a transmission spectra measurement result in the optical 90-degree hybrid circuit according to the first embodiment in the present invention, and FIG. 5B shows a diagram showing a transmission spectra measurement result in the optical 90-degree hybrid circuit according to the conventional technology.

Figure 6A:
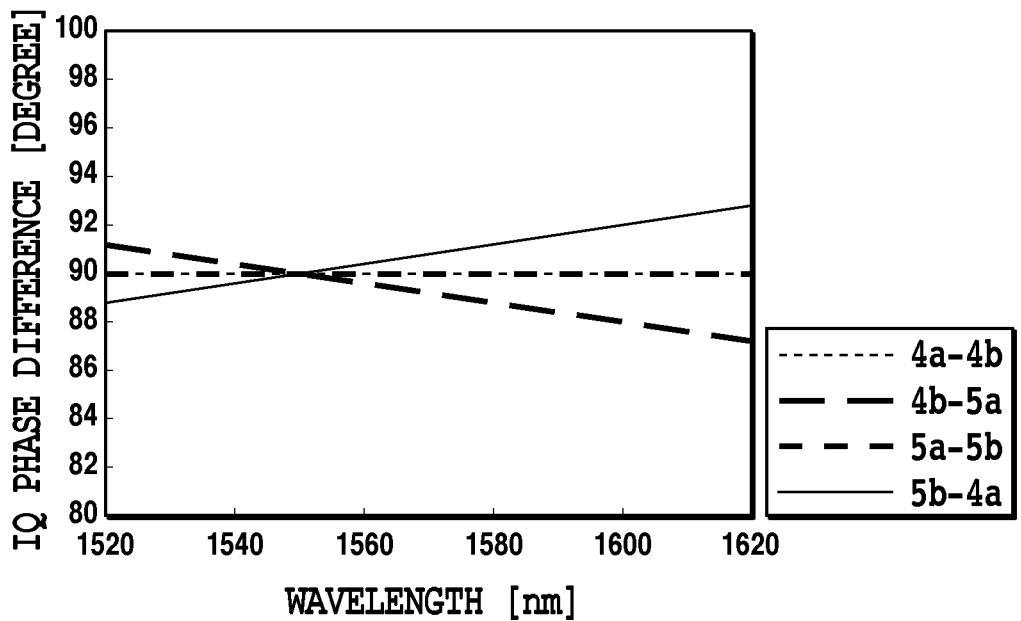
FIG. 6A is a diagram showing an evaluation result of an IQ phase difference in the optical 90-degree hybrid circuit according to the first embodiment of the present invention.
Figure 6B:
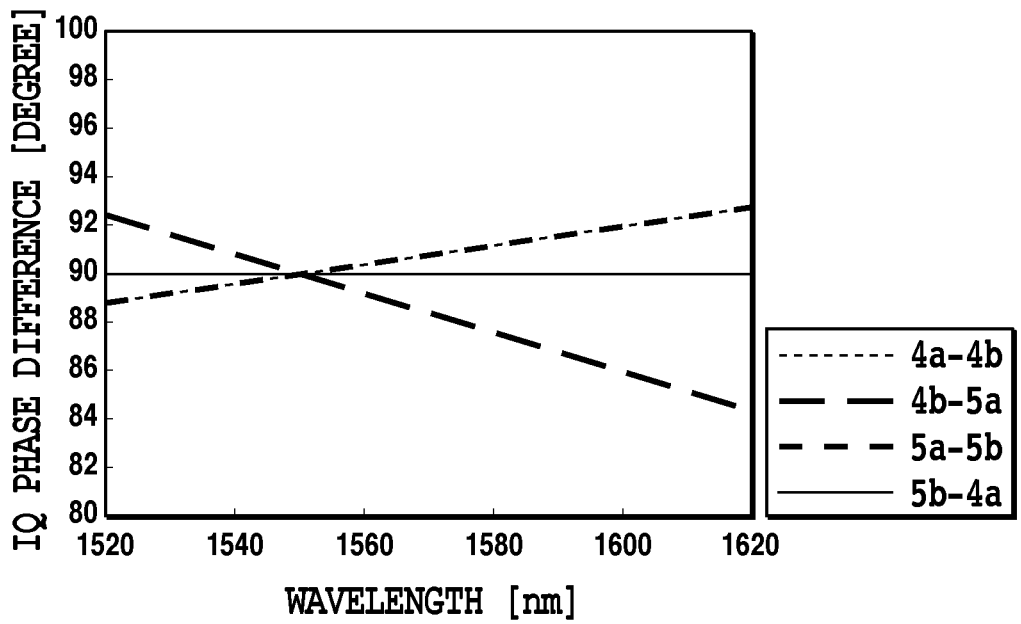
FIG. 6B is a diagram showing an evaluation result of an IQ phase difference in the optical 90-degree hybrid circuit according to the conventional technology.

FIG. 6A and FIG. 6B are diagrams each formed by plotting a phase difference between respective outputs calculated from the transmission spectra measurement result shown in each of FIG. 5A and FIG. 5B, as a function of an input optical wavelength. FIG. 6A is the plot diagram in the optical 90-degree hybrid circuit according to the first embodiment of the present invention, and FIG. 6B is the plot diagram in the optical 90-degree hybrid circuit according to the conventional technology. It was confirmed that $\alpha=0.02$ [degree/nm], $\beta=0.04$ [degree/nm], and $\lambda_1=\lambda_2=1550$ nm. In the conventional construction, the shift of the IQ phase difference out of 90 degrees in the wavelength band of 1520 to 1620 nm in the conventional technology was six degrees at the maximum. On the other hand, the shift of the IQ phase difference out of 90 degrees in the optical 90-degree hybrid circuit in the first embodiment was three degrees at the maximum, and it was confirmed that the wavelength dependency of the IQ phase difference was reduced by the effect of the present invention.

Second Embodiment

Figure 7:
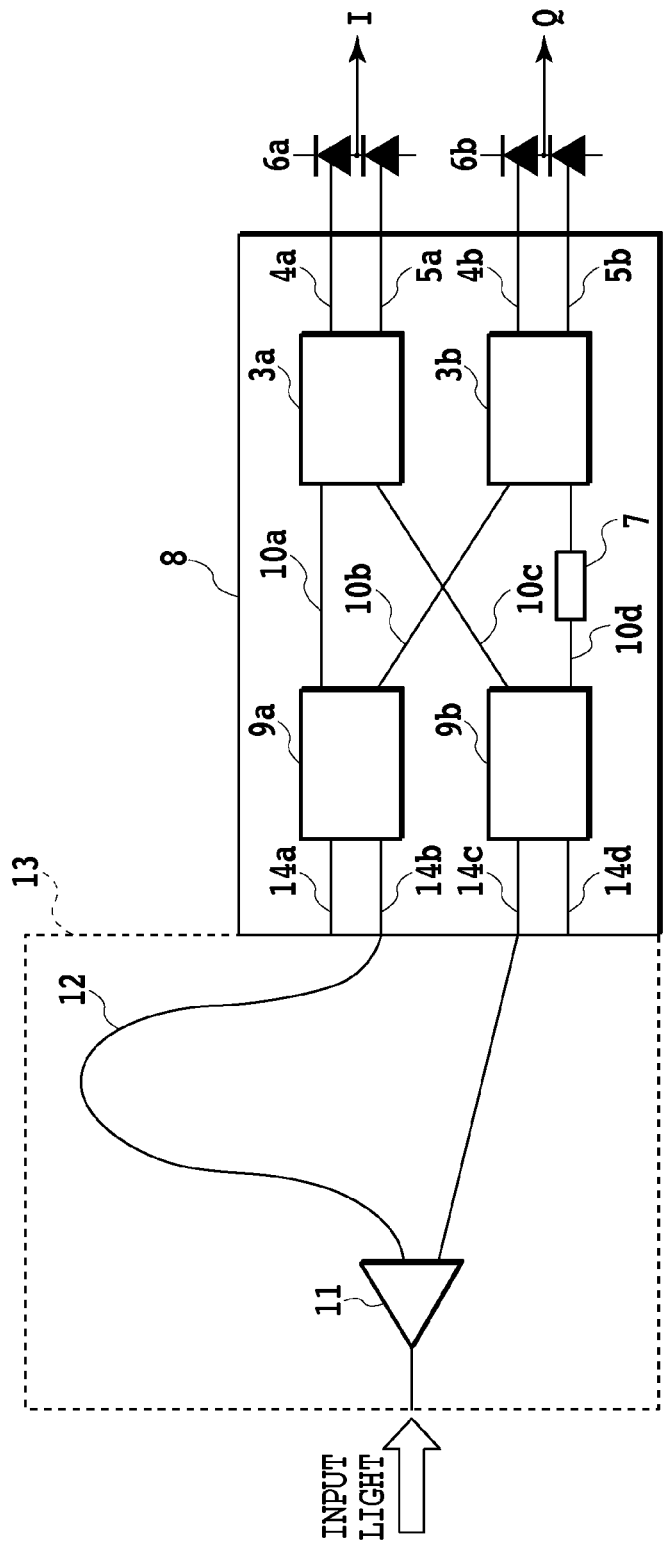
FIG. 7 is a schematic diagram showing an optical 90-degree hybrid circuit according to a second embodiment of the present invention.

FIG. 7 is a schematic diagram showing an optical 90-degree hybrid circuit actually produced according to a second embodiment. In the present embodiment, an MMI coupler provided with two input ports and two output ports was used as each of the demultiplexing optical couplers 9a and 9b. In addition, MMI coupler was designed in such a manner as to meet a condition of $\lambda_1=1550$ nm. The 90-degree phase shift section 7 was designed in such a manner as to meet a condition of $\lambda_2=1550$ nm. The PLC technology was used for production of the optical 90-degree hybrid circuit. A cross section configuration of a core has a four-way angle of 3 µm, and a specific refraction index difference is 2.5%. The core was embedded by over-clad glass having a thickness of 30 µm.

For evaluating the IQ phase difference experimentally, the optical delay circuit section 13 constructed of the optical splitter 11 and the delay line 12 was coupled to the input waveguides 14b and 14c of the optical 90-degree hybrid in the present invention. This circuit construction is formed in order that light outputted from the same light source instead of the signal light and the local oscillation light in FIG. 3 is branched, a delay is provided through the delay line to one of the branched lights, and both of the lights each are inputted into the input waveguides 14b and 14c in the optical 90-degree hybrid circuit, thus constructing an optical delay interference circuit. With adoption of the optical delay interference circuit, it is possible to calculate a relative phase difference between lights outputted from the output waveguides 4a, 4b, 5a and 5b, based upon transmission spectra outputted from the output waveguides 4a, 4b, 5a and 5b. It is apparent that this circuit construction functions as the optical 90-degree hybrid circuit by removing the optical delay circuit section 13 after the IQ phase difference evaluation is made, and the effect of the present invention is not damaged.

Figure 8A:
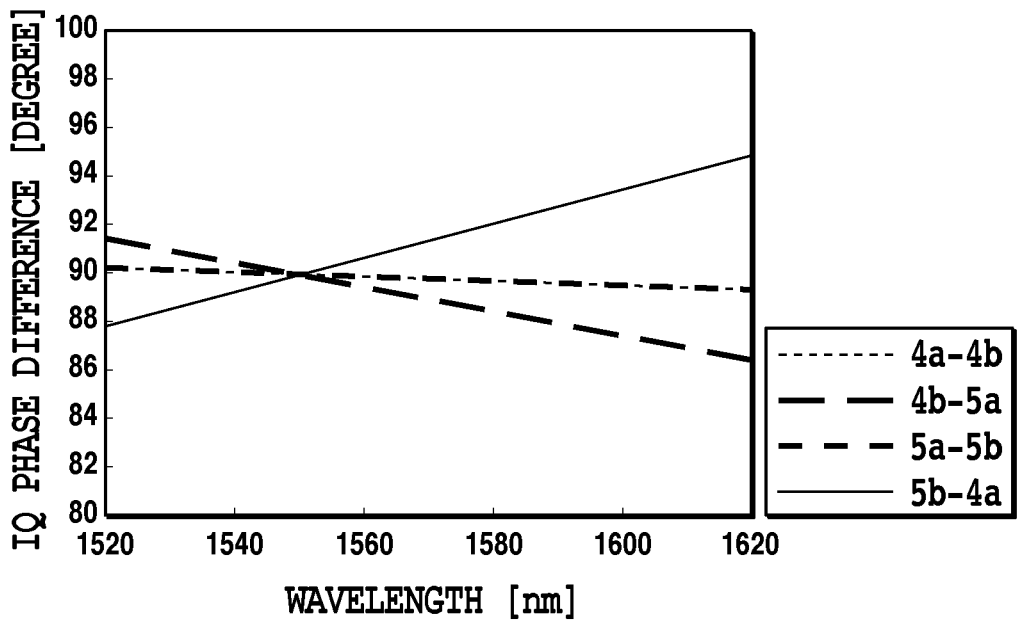
FIG. 8A is a diagram showing an evaluation result of an IQ phase difference in the optical 90-degree hybrid circuit according to the second embodiment of the present invention.
Figure 8B:
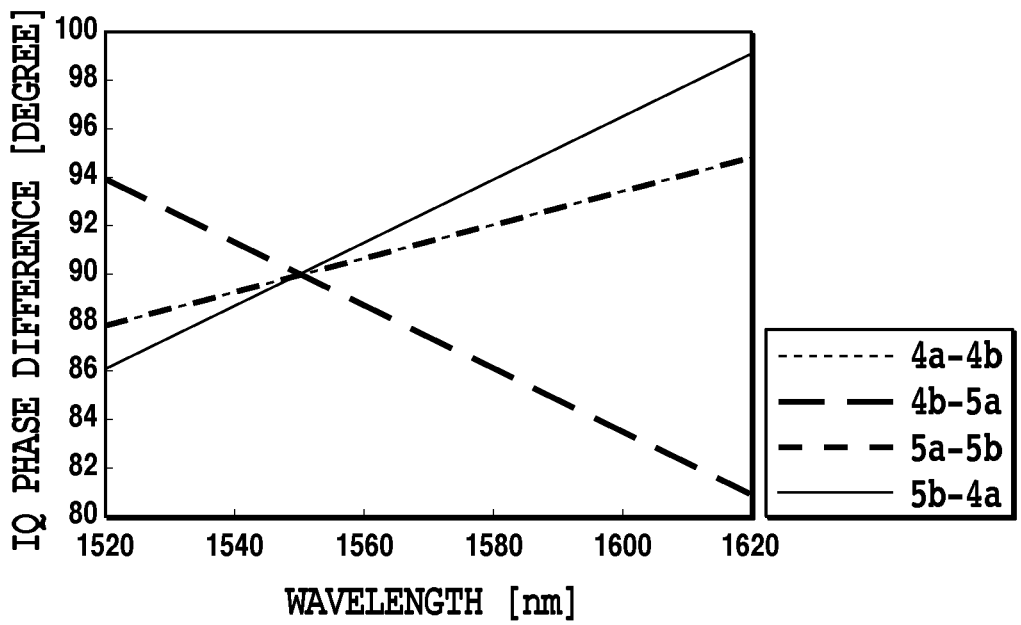
FIG. 8B is a diagram showing an evaluation result of an IQ phase difference in the optical 90-degree hybrid circuit according to the conventional technology.

FIG. 8A and FIG. 8B are diagrams each formed by plotting a phase difference between respective outputs calculated from the transmission spectra measurement result, as a function of an input optical wavelength. FIG. 8A is the plot diagram in the optical 90-degree hybrid circuit according to the second embodiment of the present invention, and FIG. 8B is the plot diagram in the optical 90-degree hybrid circuit according to the conventional technology. It was confirmed that $\alpha=0.03$ [degree/nm], $\beta=-0.07$ [degree/nm], and $\lambda_1=\lambda_2=1550$ nm. In the conventional construction, the shift of the IQ phase difference out of 90 degrees in the wavelength band of 1520 to 1620 nm in the conventional technology was nine degrees at the maximum. On the other hand, the shift of the IQ phase difference out of 90 degrees in the optical 90-degree hybrid circuit in the second embodiment was five degrees at the maximum, and it was experimentally confirmed that the wavelength dependency of the IQ phase difference was reduced by the effect of the present invention.

INDUSTRIAL APPLICABILITY

The present invention can be used as the optical 90-degree hybrid circuit which is the construction component of the optical receiver used in the coherent receiver system in the optical transmission system.

The invention claimed is:
1. An optical 90-degree hybrid circuit comprising:
a first demultiplexing optical coupler including a first input port and a second input port and branching light into two lights;
a second demultiplexing optical coupler including a third input port and a fourth input port and branching light into two lights;
a first arm waveguide connected via a through port of the first input port and via a cross port of the second input port;
a second arm waveguide connected via a cross port of the first input port and via a through port of the second input port, having a length equal to that of the first arm waveguide;

a third arm waveguide connected via a through port of the third input port and via a cross port of the fourth input port;

a fourth arm waveguide connected via a cross port of the third input port and via a through port of the fourth input port, having a length equal to that of the third arm waveguide;

a 90-degree phase shift section installed in one of the first to fourth arm waveguides to shift a phase of light by 90 degrees;

a first optical coupler connected to the first arm waveguide and the third arm waveguide; and a second optical coupler connected to the second arm waveguide and the fourth arm waveguide, wherein the light is inputted into the second input port and the third input port.

2. An optical 90-degree hybrid circuit according to claim 1, wherein each of the first demultiplexing optical coupler and the second demultiplexing optical coupler comprises a directional coupler.

3. An optical 90-degree hybrid circuit according to claim 1, wherein each of the first demultiplexing optical coupler and the second demultiplexing optical coupler comprises an MMI coupler.

4. An optical 90-degree hybrid circuit comprising:

a first demultiplexing optical coupler having first and second input ports and first and second output ports, the first demultiplexing optical coupler being configured to receive a first light at the first or second input port and branch the received first light into two lights respectively output from the first and second output ports such that the phase difference of the light output from the second output port with respect to the light output from the first output port is +90 degrees when the first light is input from the first input port, and −90 degrees when the first light is input from the second input port;

a second demultiplexing optical coupler having third and fourth input ports and third and fourth output ports, the second demultiplexing optical coupler being configured to receive a second light at the third or fourth input port and branch the received second light into two lights respectively output from the third and fourth output ports such that the phase difference of the light output from the fourth output port with respect to the light output from the third output port is −90 degrees when the second light is input from the third input port, and +90 degrees when the second light is input from the fourth input port;

first and second arm waveguides respectively connected to the first and second output ports of the first demultiplexing optical coupler, the first and second arm waveguides having an equal length;

third and fourth arm waveguides respectively connected to the third and fourth output ports of the second demultiplexing optical coupler, the third and fourth arm waveguides having an equal length;

a first optical coupler connected to the first arm waveguide and the third arm waveguide;

a second optical coupler connected to the second arm waveguide and the fourth arm waveguide; and a phase shift section positioned in the fourth arm waveguide between the second demultiplexing optical coupler and the second optical coupler, the phase shift section being configured to shift a phase of light passing therethrough by 90 degrees;

wherein the signal light is input into the second input port and the local oscillation light is input into the third input port.

* * * * *